July 29, 1952     F. B. SCOTT     2,604,794
BELT TENSIONING DEVICE FOR VARIABLE-SPEED DRIVES
Filed Jan. 15, 1948     2 SHEETS—SHEET 1
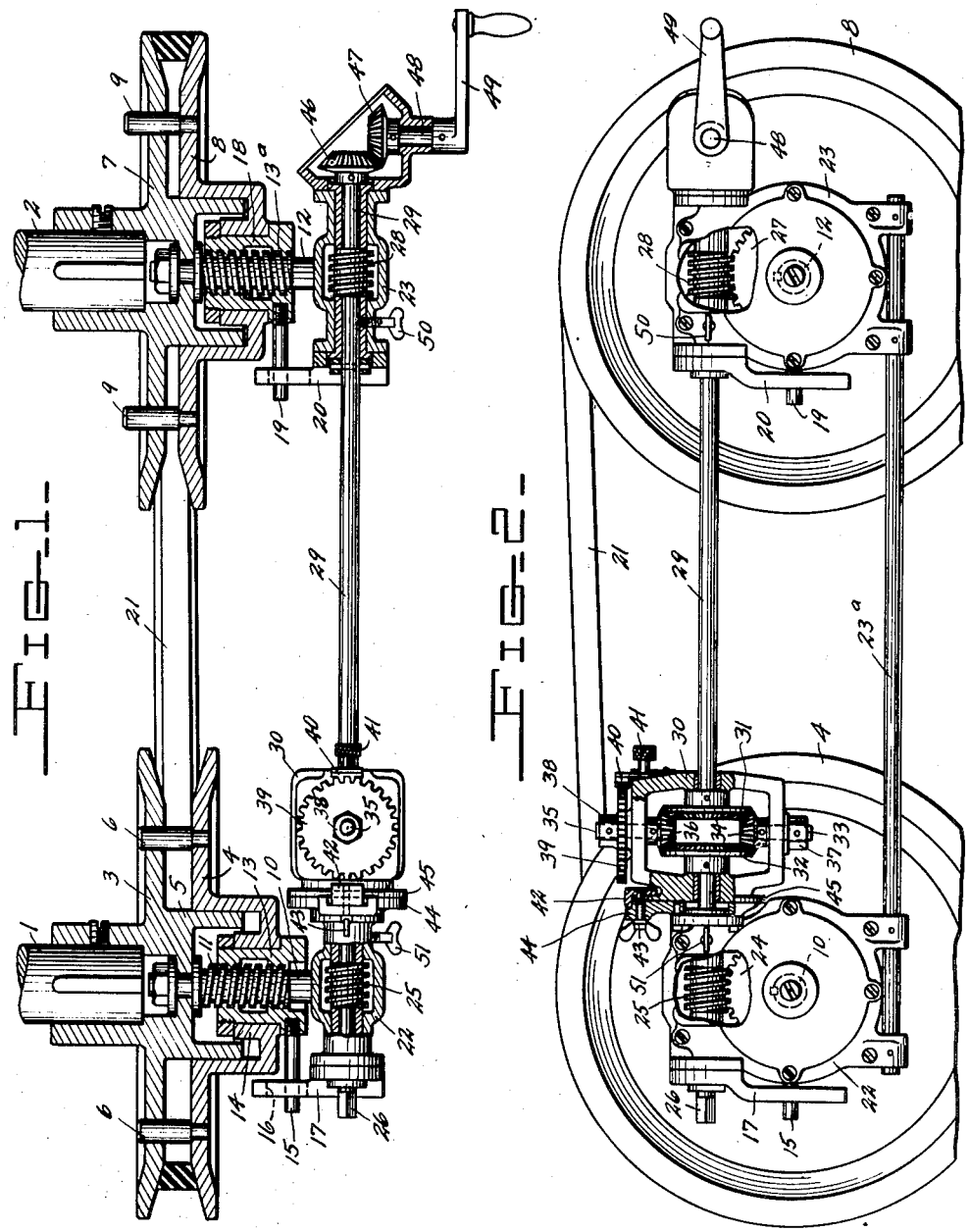
INVENTOR:
*Frederick B. Scott,*
BY
*Mason, Porter, Diller & Stewart,*
Attys.

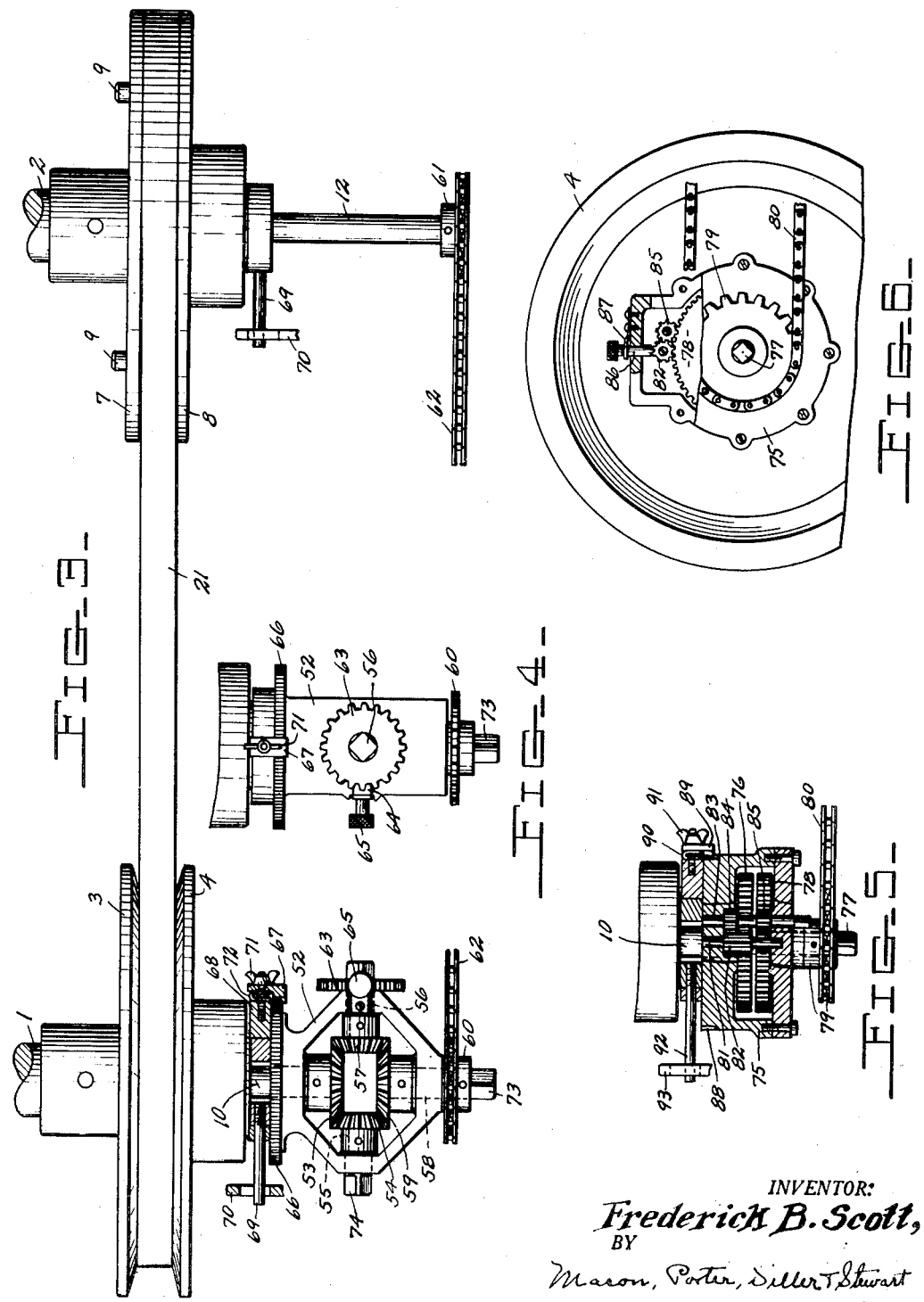

Patented July 29, 1952

2,604,794

UNITED STATES PATENT OFFICE 2,604,794

BELT TENSIONING DEVICE FOR VARIABLE-SPEED DRIVES

Frederick B. Scott, Syracuse, N. Y.

Application January 15, 1948, Serial No. 2,524

7 Claims. (Cl. 74—230.17)

The invention relates to new and useful improvements in a belt tensioning device for a variable speed drive and more particularly to a belt tensioning device for variable pitch sheaves or pulleys in single or multiple strand.

An object of the invention is to provide a mechanism whereby the shiftable members of a belt driven variable pitch drive can be simultaneously moved toward or from their associated members for increasing or decreasing tension on the driving belt.

A further object of the invention is to provide a mechanism of the above type wherein the shiftable members may also be simultaneously moved one toward and the other away from their associated members for varying the speed of the driven member.

A further object of the invention is to provide a mechanism of the above type for varying the speed of the driven belt and for varying the tension on the belt wherein the desired adjustments may be made without stopping the driving unit.

A still further object of the invention is to provide a mechanism of the above type wherein the shiftable members of a belt driven variable pitch drive may be independently moved toward or from its associated member to facilitate the replacement of the driving belt.

These and other objects will in part be obvious and will in part be hereinafter more fully disclosed.

In the drawings:

Figure 1 is a view partly in plan and partly in horizontal section of a variable pitch driving unit with the improved belt tensioning mechanism applied thereto, the section being in part through the center of the driving and driven sheaves and in part through the center of the belt tensioning and variable speed changing devices;

Figure 2 is a side elevation of the improved driving unit shown in Figure 1 with parts broken away and parts in vertical section to show the interior structure of the transmission device;

Figure 3 is a view showing partly in section a modified arrangement of the devices for varying the tension on the belt and also for varying the speed of the driven member;

Figure 4 is a side view of the transmission device shown in Figure 3;

Figure 5 is a sectional view of a modified form of transmission device which may be used for varying the speed and for varying the tension on the belt; and Figure 6 is an end view of the device shown in Figure 5 with parts broken away and in section to show the interior structure.

The invention has to do with a mechanism for varying the tension of belts, chains or flexible connectors operating on variable pitch sheaves or pulleys in single or multiple strand. For the sake of clarity, the belt tensioning mechanism is shown as applied to a single strand drive. The single strand drive is shown as transmitting power from one shaft to another, which shafts are mounted for operation on fixed centers.

As shown in Figure 1, there is a shaft 1 and a shaft 2, either of which may be a driving shaft and the other the driven shaft. Mounted on the shaft 1 is a variable pitch sheave which includes a fixed member 3 secured to the shaft 1 and a movable member 4 which is mounted on a hub 5 carried by the fixed member 3 so that it may be shifted toward and from the fixed member. Pins 6, 6 carried by the movable member pass through openings in the fixed member and will maintain the two members in fixed relation as far as rotating movements are concerned. On the shaft 2 is a similar variable pitch sheave which includes a member 7 fixed to the shaft and a member 8 mounted on the hub of the fixed member and shiftable toward and from said fixed member. Pins 9, 9 are provided for permitting this shifting of the movable member.

Rotatably secured to the fixed member 2 of the variable pitch sheave is a stub shaft 10 which is provided with a spiral thread 11. There is a similar stub shaft 12 secured to the fixed member 7 of the other variable pitch sheaves and this shaft carries a thread 13ᵃ. The threads 11 and 13ᵃ are left and right hand threads respectively.

Mounted on the stub shaft 10 is a threaded sleeve 13. The thread of this sleeve engages the thread 11 on the stub shaft. The sleeve is mounted in the hub 14 of the movable member 4 of the variable pitch sheave. The sheave is free to rotate on the sleeve but is held from endwise movement on the sleeve. A rod 15 is attached to the sleeve and engages a slot 16 in a bracket arm 17 which holds the sleeve from turning. When the stub shaft is turned in one direction, it will shift the movable member 4 toward the fixed member 3 of the variable pitch sheave and when moved in the opposite direction, then it will shift the movable member away from the fixed member. There is a similar threaded sleeve 18 associated with the stub shaft 12 and this sleeve is held from rotation by means of a rod 19 engaging a slot in a bracket 20. When the stub shaft 12 is rotated in one direction, it will cause the movable member 8 to be shifted toward the fixed member 7 and when turned in the opposite direction, it will shift the movable member 8 away from the fixed member 7.

A V-belt 21 engages the tapered faces on the variable pitch sheaves and transmits motions from one shaft to the other. Mounted on the stub shaft 10 is a housing 22. There is a similar housing 23 mounted on the stub shaft 12. A rod 23a connects these housings and prevents the same from turning on the shafts. Mounted on the stub shaft 10 is a worm gear 24. This worm gear 24 meshes with a worm gear 25 carried by a shaft 26 mounted for rotation in the housing 22.

Located in the housing 23 is a worm gear 27 which is fixed to the stub shaft 12. This worm gear 27 meshes with a worm gear 28 carried by a shaft 29 mounted for rotation in the housing 23. The shafts 26 and 29 are in alignment. Mounted on these shafts and connecting the same is a differential transmission. This transmission includes a housing 30 which is free to rotate on the shaft unless held from turning by a locking means which will be described later.

On the end of the shaft 29 is a beveled gear 31 and on the end of the shaft 26 is a beveled gear 32. Mounted in the housing 30 at one side of the shafts 26 and 29 is a stub shaft 33 carrying a beveled gear 34 which meshes with both the gears 31 and 32. At the opposite side of the housing 30 is a stub shaft 35 carrying a beveled gear 36 which meshes with both of the beveled gears 31 and 32. The stub shaft 33 carries a collar 37 which is slabbed at the sides thereof to receive a wrench whereby the stub shaft may be turned.

Mounted on the stub shaft 35 is a slabbed collar 38 by which said stub shaft may be turned. Also mounted on the stub shaft 35 is a pinion 39. A latch 40 is mounted on the housing 30 and has teeth adapted to engage the pinion 39 for preventing the turning of the same. There is a hand grip member 41 attached to this latch so that it can be lifted from engagement with the pinion so as to permit the pinion to turn freely. When the latch which is in the form of a leaf spring is lifted, it may be turned to one side or the other so that if released, it will not contact the teeth of the pinion. When, however, brought into proper position, it will when released engage the pinion and prevent it from turning. The fact that the pinion is held from turning movement does not, however, prevent the housing 30 from being rotated by the turning of the shaft 29 or 26. The housing 30 may be clamped and held in a fixed position by a clamping member 42 with which is associated a wing bolt 43, and a supporting bracket 44 which is attached to the housing 22. There is a flange 45 on the housing 30 which is gripped by this clamping member 42 so that the housing is held from rotation. The bracket 17 which prevents the sleeve 13 from turning is mounted on this housing 22. Likewise the bracket 20 cooperating with the rod 19 for preventing the sleeve 18 from turning is mounted on the other housing 23.

Mounted on the end of the shaft 29 is a beveled gear 46 which meshes with a beveled gear 47 on a stub shaft 48. A crank 49 is attached to the stub shaft 48 and may be used for turning the shaft 29.

When it is desired to vary the speed to be transmitted from one shaft to the other, the latch 40 is moved into engagement with the teeth of the pinion 39 and this will prevent the gears from turning in the differential transmission device. The clamp 42 is released so that the housing 30 is free to rotate with the shaft 29. When the crank is turned in one direction, the housing will turn with the shaft and a similar rotation in the same direction will be imparted to the shaft 26. The rotation of these shafts through the worm gears will cause the stub shafts 10 and 12 to rotate. The stub shafts will rotate in the same direction but the threads 11 and 13a are left and right hand threads respectively, and this will cause the movable member of one of the variable pitch sheaves to shift toward the fixed member associated therewith and the movable member of the other variable pitch sheaves to shift away from the fixed member with which it is associated. The result is that the speed of the driven shaft will be varied. When the crank is turned in one direction, the speed will be increased and when turned in the other direction, the speed will be decreased. While the stub shafts 10 and 12 are described as having left and right hand threads, it is understood that the worm gears 25 and 28 may have left and right hand threads in which case the stub shafts will be threaded alike.

When it is desired to vary the tension on the belt, then the clamp 42 is closed so as to lock the housing 30 from movement and the latch 40 is released so that the pinion 39 is free to turn. Under these conditions when the crank 49 is turned, it will rotate the shaft 29 in one direction and through the differential gears will rotate the shaft 26 in the opposite direction. Therefore, the stub shaft 10 will rotate in one direction and the stub shaft 12 will rotate in the opposite direction and this will cause the movable members of the variable pitch sheaves to move simultaneously equal amounts toward or from the fixed members with which they are associated. This enables the tension on the belt to be increased or decreased, depending upon the direction of rotation of the crank 49. The crank may be turned through very small increments of movement for varying the tension on the belt without appreciably disturbing the speed at which the driven shaft is operated. It will be noted that the crank may be turned while the driving units are in operation so that the speed may be varied or the tension on the belt increased or decreased without stopping or interfering in any way with the operation of the driving units.

It is sometimes desirable when replacing a belt, for example, to adjust the movable members of the sheaves independently. This is accomplished by opening the clamp 42 so that the housing 30 is free to rotate and by pulling up the latch 40 so that the leaf spring is above the recess in the housing in which it fits, then swinging it about its pivotal connection with the housing. This will permit the shaft 35 to rotate freely. The housing can also rotate freely and the unit acts as a disconnect between the shafts 29 and 26. By turning the crank 49, the sheave on the shaft 2 can be adjusted independently of the sheave on the shaft 1 and by removing the crank 49 and placing it on the slabbed collar end 37 or 38, the shaft 26 can be turned and the shiftable members of the sheave on the shaft 1 adjusted toward and from the fixed member 3. This is of particular advantage when changing belts as it is desired that both sheaves be in the maximum expanded position for removing and putting on the new belt. After the new belt has been slipped over the sheaves, it is then also necessary to re-adjust the sheaves independently so as to give the proper speed ratio between the sheaves and also obtain the proper belt tensions. In order to be sure that the housing 30 revolves freely and acts as a disconnect between the shafts 29 and 26, a set screw 50 mounted in the housing 23 may be turned against the shaft 29 to prevent it from rotating when operating the shaft 26 for adjusting the sheave on the shaft 1 and likewise a set screw 51 may be set up against the shaft 26 to prevent its rotation when operating the shaft 29 for adjusting the sheave on the shaft 2.

In Figure 3 of the drawings, there is shown a slightly modified form or arrangement of belt tensioning mechanism. In this form, the sheave on the shaft 1 includes a fixed member 3 and a movable member 4 which are arranged as described above and this movable member is moved toward and from the fixed member by a stub shaft 10 carrying a thread operating in a threaded collar in the manner described in connection with Figure 1. The sheave on the shaft 2 includes a fixed member 7 and a movable member 8 is shifted by the turning of a stub shaft 12 in the manner shown in Figure 1. The stub shaft 10 extends into the housing 52 of the differential transmission mechanism. The housing is mounted for rotation on the stub shaft. The stub shaft carries a beveled gear 53 which meshes with a beveled gear 54 on a stub shaft 55. This stub shaft is mounted in the housing 52. Diametrically opposed to the stub shaft 55 is a stub shaft 56 which carries a beveled gear 57. The beveled gear 57 meshes with the beveled gear 53. There is another stub shaft 58 mounted in the housing 52 in alignment with the stub shaft 10. This stub shaft 58 carries a beveled gear 59 which meshes with the beveled gears 54 and 57 respectively. Mounted on the stub shaft 58 is a sprocket wheel 60. Also mounted on the stub shaft 12 is a sprocket wheel 61. A sprocket chain 62 runs over these sprocket wheels 60 and 61 and thus movement is transmitted from the stub shaft 58 to the shaft 12 or vice versa.

Mounted on the stub shaft 56 is a pinion 63. A latch 64 carried by the housing 52 is adapted to engage the pinion and prevent its turning. This latch may be released by the hand grip 65. The housing 52 is provided with a tooth member 66. A clamp 67 is adapted to engage said tooth member for preventing the housing from turning. This clamp is carried by a sleeve 68 which carries a rod 69 engaging a bracket member 70 which prevents the sleeve from turning. This rod 69 also prevents the threaded sleeve in the sheave from turning. The clamp is adjusted by means of a wing nut 71 and a spring 72 disposed beneath the clamping member will move it out of engagement with the tooth member 66 when it is desired to unlock the housing 52 and permit it to rotate freely.

The operation of this modified form of construction is the same as that described above. When it is desired to vary the speed imparted by one shaft to the other, then the latch is moved into engagement with the pinion 63 for preventing the gears in the differential from turning. The housing is released by turning the wing nut 71. A crank can be attached to the slabbed end 73 of the stub shaft 58 and this will rotate the stub shaft 10 and also rotate the stub shaft 12 both in the same direction. The movable members, however, of the sheaves are shifted in opposite directions due to the right and lefthand threads controlling the position of the same, and, therefore, the turning of this stub shaft 58 under conditions stated will vary the speed imparted from one shaft to the other.

When it is desired to change the tension on the belt, then the latch 64 is moved out of engagement with the pinion 63 so as to permit the gears of the differential to rotate freely. The clamp 67 is closed so as to prevent the housing from rotating. When a crank is applied to the slabbed end 73 of the stub shaft 58, it will rotate the shaft 12 in one direction and the shaft 10 in the opposite direction, and thus it is that the movable members of both sheaves can be moved simultaneously toward or from the fixed members of the sheaves with which they are associated. For varying the tension on the belt, a crank may be applied to the slabbed end 74 of the stub shaft 55 instead of the slabbed end 73 of the stub shaft 58. Devices may be provided for locking the shafts 12 and 10 so they will not turn when it is desired to adjust independently the sheaves for the changing or replacing of the belt. A detailed description of this operation is not thought necessary as it is similar to what has been described above in connection with Figures 1 and 2.

In Figures 5 and 6, there is shown a further modified form of transmission mechanism for accomplishing the adjustments of the movable members of the variable pitch sheaves which have been described above. In this form of the invention, the stub shaft 10 extends into a gear housing 75 and carries on its outer end a gear 76. Also mounted in the gear housing 75 is a stub shaft 77 which extends into the housing and carries a gear 78. The stub shaft 77 carries a sprocket wheel 79 which is located outside of the gear housing 75 and is connected by a sprocket chain 80 to a sprocket wheel on the stub shaft 12, such as shown in Figure 3. Mounted in the gear housing 75 is a shaft 81. This shaft 81 carries a gear 82 which meshes with the gear 76. Also mounted in this gear housing is a shaft 83 which carries a gear 84 which meshes with the gear 82. The shaft 83 carries a second gear 85 which meshes with the gear 78.

In order to lock the gears against turning, a latch member 86 is provided with a tooth which is adapted to engage between the teeth of the gear 82. This latch member is carried by a spring 87. In order to lock the gear casing against turning, there is a tooth section 88 formed in the gear housing and a clamping member 89 carries a lug adapted to engage said tooth member. There is a spring 90 adapted to move the clamping member outward away from the gear housing and a ring nut 91 forces the clamping member into engagement with the gear housing. When it is desired to vary the speed of the driven sheave, the clamping member 89 is released so that the gear housing is free to rotate on the shaft 30 which supports the same. The latch 86 is moved into engagement with a gear 82 and this locks the gears from turning. If the crank is placed on the slabbed end of the stub shaft 77, the stub shaft can be turned and this through the sprocket chain will turn the shaft 12. It will also turn the housing and this will cause the shaft 10 to turn therewith as the gears are locked so that they cannot turn.

The two shafts 10 and 12 will be turned in the same direction and by reason of the right and lefthand threaded sections, the movable member of one of the sheaves will be shifted toward the fixed member and the movable member of the other sheave will be moved away from the fixed member and this will cause a variation in the speed of the driven shaft. The speed may be increased or decreased, depending upon the direction of rotation of the stub shaft 77. When it is desired to tighten the belt, then the gear casing is clamped so that it cannot turn and the latch is lifted so that the gears are free to turn. Again when a crank is placed on the stub shaft 77, it will through the sprocket chain turn the shaft 12 in one direction and through the connecting gears it would turn the shaft 10 in the opposite direction. The right and lefthand threads turning in opposite directions will cause the movable members of the sheaves to simultaneously move toward or away from the fixed members with which they are associated and thus the tension on the belt may be increased or decreased. The clamping member 89 is carried by a sleeve which is mounted on the shaft 10 and held from rotation by a rod 92 which engages a bracket 93 carried by any suitable stationary member of the unit.

While a single strand has been illustrated for transmitting motion from one sheave to the other, it is understood that these sheaves may be formed with multiple sections and a plurality of strands used for transmitting motion, if desired. If a multiple sheave is used, then a stub shaft for varying the pitch of the sheave would operate in connection with each section. While a belt has been referred to above, it is understood that this term is used in the broader sense and may be any form of endless flexible drive for connecting the sheaves for transmitting motion from one to the other.

It is obvious that many changes in the details of construction may be made without departing from the spirit of the invention as set forth in the appended claims.

I claim:

1. A variable pitch sheave drive comprising a driving shaft and a driven shaft each carrying a variable pitch sheave, a belt cooperating with said sheaves for transmitting motion from one to the other, a stub shaft associated with each sheave and operating when turned to increase or decrease the pitch of the sheave with which it is associated, a manually actuated sheave adjusting shaft, devices for rotatively connecting said adjusting shaft to one of said stub shafts, a reversible transmission gear train actuated by said adjusting shaft, and devices connecting said gear train to said other stub shaft whereby the stub shafts may be simultaneously rotated in opposite directions by said adjusting shaft.

2. A variable pitch sheave drive comprising a driving shaft and a driven shaft each carrying a variable pitch sheave, a belt cooperating with said sheaves for transmitting motion from one to the other, a stub shaft associated with each sheave and operating when turned to increase or decrease the pitch of the sheave with which it is associated, a manually actuated sheave adjusting shaft, devices for rotatively connecting said adjusting shaft to one of said stub shafts, a reversible transmission gear train actuated by said adjusting shaft and devices connecting said gear train to said other stub shaft whereby the stub shafts may be simultaneously rotated in opposite directions by said adjusting shaft, and means for locking said transmission gear train so that it rotates bodily with said adjusting shaft whereby the stub shafts may be simultaneously rotated in the same direction by the adjusting shaft.

3. A variable pitch sheave drive comprising a driving shaft and a driven shaft each carrying a variable pitch sheave, a belt cooperating with said sheaves for transmitting motion from one to the other, a stub shaft associated with each sheave and operating when turned to increase or decrease the pitch of the sheave with which it is associated, mechanism connected to said stub shafts including shaft sections connected to each stub shaft and arranged in alignment with the ends thereof spaced, a gear mounted on the end of each shaft section, a housing mounted on said shaft sections for free rotation and enclosing said gears, gears mounted in said housing and connecting the gears on the shaft sections, and means for locking said gears so that the shaft sections, gears and housing will turn as a unit and vary the speed of the belt.

4. A variable pitch sheave drive comprising a driving shaft and a driven shaft each carrying a variable pitch sheave, a belt cooperating with said sheaves for transmitting motion from one to the other, a stub shaft associated with each sheave and operating when turned to increase or decrease the pitch of the sheave with which it is associated, mechanism connected to said stub shafts including shaft sections connected to each stub shaft and arranged in alignment with the ends thereof spaced, a gear mounted on the end of each shaft section, a housing mounted on said shaft sections for free rotation and enclosing said gears, gears mounted in said housing and connecting the gears on the shaft sections, means for locking said gears so that the shaft sections, gears and housing will turn as a unit, and means for locking said housing from rotation with the shaft sections whereby the shaft sections may turn in opposite directions when the gears are released and free to rotate for varying the tension on the belt.

5. A variable pitch sheave drive comprising a driving shaft and a driven shaft each carrying a variable pitch sheave, a belt cooperating with said sheaves for transmitting motion from one to the other, a stub shaft associated with each sheave and operating when turned to increase or decrease the pitch of the sheave with which it is associated, mechanism connected to said stub shafts including shaft sections connected to each stub shaft and arranged in alignment with the ends thereof spaced, a gear mounted on the end of each shaft section, a housing mounted on said shaft sections for free rotation and enclosing said gears, gears mounted in said housing and connecting the gears on the shaft sections, means for locking said gears so that the shaft sections, gears and housing will turn as a unit, means for selectively locking either of the shaft sections whereby the other shaft section may be turned when the gears are released and free to rotate, and manual means for independently rotating either shaft section for opening the sheave associated therewith to facilitate the changing of the belt.

6. A variable pitch sheave drive comprising a driving shaft and a driven shaft, each carrying a variable pitch sheave, a belt cooperating with the sheaves for transmitting motion from one to the other, a stub shaft associated with each sheave, a right hand threaded sleeve associated with one stub shaft for varying the pitch of the sheave associated therewith and a left hand threaded sleeve associated with the other for varying the pitch of the sheave associated therewith, mechanism connecting said stub shafts including a shaft section arranged in alignment with one of said stub shafts, said shaft section having its inner end spaced from the outer end of the stub shaft, a gear mounted on the outer end of the stub shaft and a gear mounted on the inner end of the shaft section, a housing rotatably mounted on said stub shaft and enclosing said gears, gears carried by said housing and connecting the gear on the stub shaft with the gear on the shaft section, and means for locking the gears which are carried by the housing from rotation whereby the shaft section, housing and stub shaft may be rotated as a unit for varying the speed of the belt.

7. A variable pitch sheave drive comprising a driving shaft and a driven shaft, each carrying a variable pitch sheave, a belt cooperating with the sheaves for transmitting motion from one to the other, a stub shaft associated with each sheave, a right hand threaded sleeve associated with one stub shaft for varying the pitch of the sheave associated therewith and a left hand threaded sleeve associated with the other for varying the pitch of the sheave associated therewith, mechanism connecting said stub shafts including a shaft section arranged in alignment with one of said stub shafts, said shaft section having its inner end spaced from the outer end of the stub shaft, a gear mounted on the outer end of the stub shaft and a gear mounted on the inner end of the shaft section, a housing rotatably mounted on said stub shaft and enclosing said gears, gears carried by said housing and connecting the gear on the stub shaft with the gear on the shaft section, means for locking the gears which are carried by the housing from rotation whereby the shaft section, housing and stub shaft may be rotated as a unit for varying the speed of the belt, and means for locking the housing from rotation whereby when the gears are released the shaft sections may be turned in opposite directions for varying the tension of the belt.

FREDERICK B. SCOTT.

REFERENCES CITED

The following references are of record in the file of this patent:

UNITED STATES PATENTS

| Number | Name | Date |
| --- | --- | --- |
| 2,158,047 | Weston | May 9, 1939 |
| 2,170,838 | Rossman | Aug. 29, 1939 |
| 2,298,395 | Lewellen | Oct. 13, 1942 |
| 2,431,494 | Morse | Nov. 25, 1947 |
| 2,487,980 | Otto | Nov. 15, 1949 |